(12) United States Patent
Metcalf

(10) Patent No.: US 9,119,050 B1
(45) Date of Patent: Aug. 25, 2015

(54) APPARATUS AND PROCESS FOR MOBILE COMIC SERIALIZATION USING MESSAGING ON THE MOVING KNOWLEDGE ENGINE PLATFORM

(71) Applicant: David Metcalf, Merritt Island, FL (US)

(72) Inventor: David Metcalf, Merritt Island, FL (US)

( * ) Notice: Subject to any disclaimer, the term of this patent is extended or adjusted under 35 U.S.C. 154(b) by 146 days.

(21) Appl. No.: 14/092,391

(22) Filed: Nov. 27, 2013

Related U.S. Application Data

(63) Continuation-in-part of application No. 12/191,038, filed on Aug. 13, 2008, now abandoned.

(60) Provisional application No. 60/955,385, filed on Aug. 13, 2007.

(51) Int. Cl.
*G06Q 10/00* (2012.01)
*H04W 8/18* (2009.01)
*G06F 17/24* (2006.01)

(52) U.S. Cl.
CPC *H04W 8/18* (2013.01); *G06F 17/24* (2013.01)

(58) Field of Classification Search
CPC .................................................. G06F 3/0483
USPC ........................... 709/217, 219, 220, 246, 225
See application file for complete search history.

(56) References Cited

U.S. PATENT DOCUMENTS

| | | | |
|---|---|---|---|
| 6,907,223 B2 | 6/2005 | Murphy | |
| 6,988,138 B1 | 1/2006 | Beams | |
| 7,280,991 B1 | 10/2007 | Beams | |
| 7,383,189 B2 | 6/2008 | Halonen | |
| 7,383,505 B2 | 6/2008 | Shimizu | |
| 7,386,517 B1 | 6/2008 | Donner | |
| 7,388,491 B2 | 6/2008 | Chand | |
| 7,389,235 B2 | 6/2008 | Dvorak | |
| 7,389,238 B2 | 6/2008 | Sansone | |
| 7,389,351 B2 | 6/2008 | Horvitz | |
| 7,398,267 B2 | 7/2008 | Fenton-Jones | |
| 7,849,043 B2 | 12/2010 | Woolf | |
| 7,865,394 B1 | 1/2011 | Calloway | |
| 7,873,588 B2 | 1/2011 | Sareday | |
| 2001/0049087 A1 | 12/2001 | Hale | |
| 2003/0059762 A1 | 3/2003 | Fujiwara | |
| 2004/0021673 A1* | 2/2004 | Alessi et al. | 345/619 |
| 2005/0026129 A1 | 2/2005 | Rogers | |
| 2005/0250439 A1* | 11/2005 | Leslie | 455/11.1 |
| 2005/0277102 A1 | 12/2005 | Gillette | |
| 2005/0281395 A1 | 12/2005 | Wescott | |
| 2006/0059007 A1 | 3/2006 | Chen | |

(Continued)

OTHER PUBLICATIONS

"XML Serialization in .NET"—Venkat Subramaniam, Durasoft Corp, Jun. 2009 https://www.agiledeveloper.com/articles/XMLSerialization.pdf.*

(Continued)

*Primary Examiner* — Randy Scott
(74) *Attorney, Agent, or Firm* — Brian S. Steinberger; Law Offices of Brian S. Steinberger, P.A.

(57) ABSTRACT

Methods, processes, systems, apparatus and devices for delivering two way multimodal serialized comic content media files that uses a multimedia storage and delivery system. The communications utilize multi-modal inputs and multi-modal outputs to generate and access serialized comic content media files over the World Wide Web and telephone mediums with wireless communication devices and desktop computers.

18 Claims, 12 Drawing Sheets

(56) References Cited

U.S. PATENT DOCUMENTS

| | | |
|---|---|---|
| 2006/0199165 A1 | 9/2006 | Crowhurst |
| 2007/0026374 A1 | 2/2007 | Sanregret |
| 2007/0180058 A1 | 8/2007 | Wu |
| 2007/0231781 A1 | 10/2007 | Zimmermann |
| 2008/0050713 A1 | 2/2008 | Avedissian |
| 2008/0070526 A1 | 3/2008 | Donahue |
| 2008/0070602 A1 | 3/2008 | Donahue |
| 2008/0071866 A1 | 3/2008 | Donahue |
| 2008/0133716 A1 | 6/2008 | Rao |
| 2009/0081630 A1 | 3/2009 | Jeffers |

OTHER PUBLICATIONS

Noessel, Mobile Learning as a Service Offering with Near-Term Technologies, Learning and Mobile Devices, Learning and Skills Development Agency, 2004, pp. 117-126.

Colley, et al., Take a Bite: Producing Accessible Learning Materials for Mobile Devices, Learning with Mobile Devices, Learning and Skills Development Agency, 2004, pp. 43-46.

Armstrong, et al., Text-Message Reminders to Improve Sunscreen Use: a Randomized, Controlled Trial Using Electronic Monitoring, Arch. Dermatol, 2009, pp. 1230-1236, vol. 145, No. 11.

Byrne, et al., Seven-Year Trends in Employee Health Habits from a Comprehensive Workplace Health Promotion Program at Vanderbilt University, American College of Occupational and Environmental Medicine, 2011, pp. 1372-1381, vol. 53, No. 12.

Fjeldsoe, et al., MobileMums: A Randomized Controlled Trial of an SMS-Based Physical Activity Intervention, Ann. Behav. Med., 2010, pp. 101-111, vol. 39.

Hurling, et al., Using Internet and Mobile Phone Technology to Deliver an Automated Physical Activity Program: Randomized Controlled Trial, Journal of Medical Internet Research, 2007, retrieved on Nov. 22, 2013, retrieved from http://www.jmir.org/2007/2/e7/, 11 pages.

Loeppke, et al., The Association of Technology in a Workplace Wellness Program with Health Risk Factor Reduction, J. Occup. Environ. Med., 2013, pp. 259-264, vol. 55, No. 3, abstract.

Merrill, et al., Effectiveness of a Workplace Wellness Program for Maintaining Health and Promoting Healthy Behaviors, J. Occup. Environ. Med., 2011, pp. 782-787, vol. 53, No. 7, abstract.

Osilla, et al., Systematic Review of the Impact of Worksite Wellness Programs, Am. J. Manag. Care, 2012, pp. e68-e87, vol. 18, No. 2, abstract.

Perez, Twitter Novels: Not Big Success Stories Yet, 2008, retrieved on Nov. 25, 2013, retrieved from http://readwrite.com/2008/09/02/twitter_novels_not_big_success_stories, 5 pages.

Serious Twitterature: The Online Future of the Novel, Robert W. Deutsch Foundation, 2011, retrieved on Nov. 25, 2013, retrieved from http://http://rwdfoundation.org/new_ideas_directions/arts_and_culture/serious_twitterature_the_onlin . . . , 3 pages.

Vosloo, et al., m4Lit: A Teen m-Novel Project in South Africa, 2009, pp. 1-5.

Vosloo, et al., m4Lit (Mobiles for Literacy) Project Findings, Shuttleworth Foundation, 2010, 60 pages.

* cited by examiner

Mobile Learning Media System - Instructor/Subject Expert Input

Fig. 9

Selection of student-preferred multimodal delivery options

Web page

User name    Select delivery method

Choose:

SMS
Email
Voice message (IVR)
Web

APPARATUS AND PROCESS FOR MOBILE COMIC SERIALIZATION USING MESSAGING ON THE MOVING KNOWLEDGE ENGINE PLATFORM

This application is a continuation-in-part of U.S. patent application Ser. No. 12/191,038 filed on Aug. 13, 2008 which claims the benefit of priority to U.S. Provisional Patent Application Ser. No. 60/955,385 filed Aug. 13, 2007.

FIELD OF INVENTION

This invention relates to mobile learning and education, in particular to methods, processes, systems, apparatus and devices for delivering two way multimodal comic serialization using multimedia messaging system on the moving knowledge engine platform by inputting and outputting media files over the world wide web, telephone medium, wireless communication devices and desktop computers.

BACKGROUND AND PRIOR ART

While computers have been increasingly used in learning environments, their use has primarily been to having students use the computers for word processing functions when writing papers, and/or for web based classes. While increasing some versatility, there are still problems with learning environments. For example, current techniques limit a professor, who either online or in the classroom, has a great idea. Right now, the inertia of having to get online, post the idea and present it out to a class in a very formal way or save the notes until the actual day of a lecture in the class takes all the spontaneity and excitement of an event. There has been poor activity in using different types of multimodal inputs and multimodal outputs in a learning/educational environment. Recent advances in multimedia for mobile device delivery and advanced interoperability options have not been fully exploited in an educational or learning industry context.

Current developments in mobile and wireless technologies allow for the design and implementation of ubiquitous learning environments. Recent studies assessing the potential for mobile learning show promising results in Asia and Europe (Chapman, C, 2003; Thornton & Houser, 2004; Milrad et al., 2006), while less evidence of usage and penetration of these technologies for mobile learning has been demonstrated in the US (Soloway et al., 2002). What is needed is a global effort on combining proven, reliable technologies with innovative pedagogical approaches and modern techniques for development. These are challenging problems to solve and they demand creative ways of thinking that can be inspired by the Renaissance school of thought.

Various types of proposals appear in U.S. patents and published U.S. patent applications. See for example, U.S. Pat. No. 7,280,991 to Beams et al.; U.S. Pat. No. 7,383,189 to Halonen et al.; U.S. Pat. No. 7,383,505 to Shimizu et al.; U.S. Pat. No. 7,386,517 to Donner; U.S. Pat. No. 7,388,491 to Chand et al.; U.S. Pat. No. 7,389,238 to Sansone et al.; U.S. Pat. No. 7,389,351 to Horvitz; and U.S. Pat. No. 7,398,267 to Fenton-Jones. Also, see for example: U.S. Published Patent Applications: 2005/0277102 to Gillette et al; 2005/0281395 to Wescott; 2006/0059007 to Chen et al.; 2007/0026374 to Sanregret; 2007/0180058 to Wu et al.; 2008/0070526, 2008/0071866 and 2008/0070602 all to Donahue; and 2008/0133716 to Rao et al. A discussion of the U.S. patents followed by the Published patent applications will now be described.

U.S. Pat. No. 7,280,991 to Beams et al. describes "creating collaborative simulations for creating collaborative simulations with multiple roles for a single student", title, requires students to access a learning system with full computers, and not for mobile devices.

U.S. Pat. No. 7,383,189 to Halonen et al. describes a "method and device for providing speech enabled input in an electronic device having a user interface", title, that is restricted to modes related to screen and key and audio inputs. Halonen does not describe, teach or suggest multi-modal inputs from email, SMS, voice (IVR) and Web delivery from the same central system (Mobile Learning Media System). Our claim could also be dependent on education/learning function.

U.S. Pat. No. 7,383,505 to Shimizu et al. describes an "information sharing device and information sharing method", title, using email for the input of annotations, and is not for providing multimodal inputs and multimodal outputs for delivering two way multimodal learning communications between instructors/educators/course providers, and students over the world wide web and telephone mediums through wireless communication devices and desktop computers.

U.S. Pat. No. 7,386,517 to Donner describes "system and method for determining and/or transmitting and/or establishing communication with a mobile device user for providing, for example, concessions, tournaments, competitions, matching, reallocating, upgrading, selling tickets, other event admittance means, goods and/or services", title. This system and method is not for delivering two way multimodal learning communications between instructors/educators, and students over the world wide web and through wireless communications.

U.S. Pat. No. 7,388,491 to Chand et al. describes a "mobile RFID reader with integrated location awareness for material tracking and management", title, that requires a "location determination subsystem", abstract, and is not for providing multimodal inputs and multimodal outputs for delivering two way multimodal learning communications between instructors/educators/course providers, and students over the world wide web and telephone mediums through wireless communication devices and desktop computers.

U.S. Pat. No. 7,389,238 to Sansone et al. describes a "recipient elected messaging services" method, title, for shipping/mail delivery, and not for providing multimodal inputs and multimodal outputs for delivering two way multimodal learning communications between instructors/educators/course providers, and students over the world wide web and telephone mediums through wireless communication devices and desktop computers.

U.S. Pat. No. 7,389,351 to Horvitz describes "system and method for identifying and establishing preferred modalities or channels for communications based on participants' preferences and contexts", title, and discusses various types of optimal communication modes generally limited to business type meetings with context-sensitive delivery. Horvitz is not directed to delivering two way multimodal learning communications between instructors/educators, and students over the world wide web and through wireless communications.

U.S. Pat. No. 7,398,267 to Fenton-Jones describes an "information system", title, that allows users to access a "virtual room" by the "internet or telephone", and is limited generally to web researchers and "telephone callers", and generally for sharing common information with limited delivery modes. This system is not for delivery of work and assignments for example, from instructors to students, and not for the posting of assignments and using email, and voice mail two way communications between students and educators.

The above referenced U.S. Published patent applications will now be described. U.S. Published Patent Application 2005/0281395 to Wescott describes "methods and apparatus for an interactive audio learning system", title, that uses wireless devices for the development of foreign language skills which is limited audio communications, and does not include any text or other types of visual data two way communications.

U.S. Published Patent Application 2005/0277102 to Gillette et al describes "methods and systems for interactive learning and other information exchanges such as for use in a mobile learning environment", title, that is limited to being Web-based and does not take into account two-way messaging technologies (such as SMS, e-mail, voice [IVR]) as primary modes of interaction.

U.S. Published Patent Application 2006/0059007 to Chen et al. described "systems and methods for integrating course data', title, that use mobile devices to receive online course pages by instant messaging or MMS (Multimedia Messaging Service), as a generally one way (teacher to student) transmission of material. However, the Chen techniques are limited to general types of one way (teacher to student) transmissions, and do not allow for two way communications, and do not allow for email connections, etc.

U.S. Published Patent Application 2007/0026374 to Sanregret describes "system and method for the delivery of education solutions via handheld devices", title. This systems and method is a multi-device, for mobile web use, but does not allow for messaging and any descriptions, teachings or suggestions of context. This system and method is not for delivering two way multimodal learning communications between instructors/educators, and students over the world wide web and through wireless communications.

U.S. Published Patent Application 2007/0180058 to Wu et al. describes "system and method for providing mobile information server and portable device . . . ", title, and is not for delivering two way multimodal learning communications between instructors/educators, and students over the world wide web and through wireless communications.

U.S. Published Patent Applications 2008/0070526, 2008/0071866 and 2008/0070602 to Donahue are generally directed to methods and systems for authoring mobile book messages. These applications are generally directed to methods and systems from authors to subscribers using graphical user interfaces limited to the chapters, themes and topics of an authored book, and not for delivering two way multimodal learning communications between instructors/educators, and students over the world wide web and through wireless communications.

U.S. Published Patent Application 2008/0133716 to Rao et al. describes "matching network system for mobile devices", title, primarily for matching of services and transactions based on personality profiles and behavior models of users of communication devices and products and services. This system is not for delivering two way multimodal learning communications between instructors/educators, and students over the world wide web and through wireless communications.

Mobile Persuasive Campaigns for Health—Health promotional campaigns intended to improve knowledge of health issues and change habits have been gaining traction. While they have only recently started to receive large amounts of mainstream publicity, these programs have a history of success that is well documented in the scientific literature, ranging from improvements in biometric values, to improvements in health-related behaviors such as exercise and diet, to even more complex health issues, such as substance abuse and mental health (Loeppke 2013; Osilla 2012; Byrne 2011; Merrill 2011).

Several mobile SMS health programs have shown some success in changing health behaviors. In their messaging program to improve sunscreen use, Armstrong et al. at Harvard's Center for Connected Health (2009) saw higher adherence rates among participants than the control group. The final mean daily adherence rate was 56.1% for the reminder group versus 30% for the control. Weight control and exercise programs have made up the majority of studies and also show general success.

The MobileMums program, which sent 3-5 text messages per week to new mothers increased self-reported physical activity frequency by 1.82 days per week and walking exercise frequency by 1.08 days per week (Fjeldsoe, Miller, & Marshall, 2010). Other programs have also demonstrated increases in physical activity among the test groups (Hurling et al., 2007; Shapiro et al., 2012).

Serialized Mobile Reading—Mobile phone or keitai novels have been very successful in Japan, particularly among young women. They are frequently serialized on web sites like Maho i-Land, which hosts over a hundred thousand titles of various lengths.

Several highly successful keitai novels have been published in print, with titles like Deep Love and Eternal Dream selling over a million copies each, and four of the five top spots in Japan's 2007 literary best-sellers list held by phone novels (Goodyear, 2008). An internet user survey by japan.internet.com (2010) found that 96.4% were familiar with keitai novels, and of that number 31.4% read them, an increase of 9.4 percentage points from the previous year's survey. The novels are largely popular with, and written by, young women, and have retained a steady readership online even though sales of print versions have apparently declined (Nishimura, 2011).

Though Japan has the most success, and most prominent use, of serialized mobile reading, the concept has translated elsewhere. The m4Lit project in South Africa, which posted a mobile novel serialized through a mobile website and also via the MXit messaging application, had highly encouraging results in gaining readership among a population that largely does not read books; the research team saw higher usage on MXit, where the novel was available all at once, rather than the serialized site, but this may have been due to usability issues (Vosloo, Walton, & Deumert, 2008; Vosloo, 2010).

A number of writers in the United States have used social networking services like Twitter, which are frequently accessed via mobile devices, to serialize fiction (RWD Foundation, 2011). So far, their success has been somewhat variable, and many of the prominent ones have been done by authors with already established reputations (Perez, 2008) but they do suggest the potential for mobile serialized narratives to work with American audiences.

As referenced above, advances in multimedia for mobile device delivery and advanced interoperability options have not been fully exploited. Thus, a need exists for combining the expected outcomes and extending the capabilities to include two-way, multimodal interactivity and additional functionality.

SUMMARY OF THE INVENTION

A primary objective of the present invention is to provide methods, processes, systems, apparatus and devices for providing multimodal inputs and multimodal outputs for delivering two way multimodal learning communications between instructors/educators/course providers, and students over the World Wide Web and telephone mediums through wireless communication devices and desktop computers.

A secondary objective of the present invention is to provide moving knowledge systems, processes, and methods as a two-way, interactive and expanded delivery to email, with interactive voice response, and mobile Web capability.

A third objective of the present invention is to provide systems, processes, methods of providing an educational multimedia storage and delivery system, that controls the exchange of inputs from instructors/educators/course providers using multi-modal inputs, and students/end-users using multimodal outputs to access learning and educational materials and communications.

A fourth objective of the present invention is to provide systems, processes, methods with a flexible and extensible input and delivery system that can accommodate new forms of media and mixed mode delivery based on the context of the instructor and/or learner.

A fifth objective of the present invention is to provide an educational multimedia storage and delivery system allowing for access through mobile devices that extends the utility of the learning to performance at the point of need and in remote contexts in addition to fixed contexts all from the same storage and delivery system.

A sixth objective of the present invention is to provide an educational multimedia storage and delivery system, that combines multi-modal inputs that include E-mail/text messaging content push, that can be used with broadcasting of podcasts, and multi-modal outputs that can include delivery to eBooks, having secure access, such as for example, SDRM (secure digital rights management) along with receiving text, audio, video and web content.

A seventh objective of the present invention is to provide an educational multimedia storage and delivery system having multi-modal inputs and multi-modal outputs for delivering learning educational media files, that can be combined with Digital Video Recorder (DVR) and other mobile VOD (Video On Demand) for learning content.

An eighth objective of the present invention is to provide an educational multimedia storage and delivery system having multi-modal inputs and multi-modal outputs for delivering learning educational media files, that can be combined with online learning games.

A ninth objective of the present invention is to provide an educational multimedia storage and delivery system having multi-modal inputs and multi-modal outputs for delivering learning educational media files, that can be combined with automated voice access.

A tenth objective of the present invention is to provide an educational multimedia storage and delivery system having multi-modal inputs and multi-modal outputs for delivering learning educational media files, that can be combined with links to portals and course management systems.

An eleventh objective of the present invention is to provide an educational multimedia storage and delivery system having multi-modal inputs and multi-modal outputs for delivering learning educational media files, that can be combined with location based learning, and learning communities.

A twelfth objective of the present invention is to provide an educational multimedia storage and delivery system having multi-modal inputs and multi-modal outputs for a Moving Knowledge content delivery engine that distributes an interactive, educational comic to users in a serialized mobile format.

A multimodal serialized comic distribution method can include the steps of providing a serialized comic content in a multimodal messaging program, creating a comic content distribution media file for serial distribution of the serialized comic content, uploading the serialized comic content media file to a serialized comic content multimedia storage and delivery system through a communication medium, the communication medium selected from at least one of a wireless communication device and an internet connected computer, communicating existence of the serialized comic content media file to plural users, serially distributing the serialized comic content media file multimedia storage and delivery system so as to be accessible by users recognized to receive the serialized comic content medial file, accessing the serialized comic content file by one or more of the plural users through a user communication medium, recording distribution of the serially distributed comic content to the plural users on based a user identification, and providing two way multimodal interactive communications between a serialized comic content provider and one or more of the plural users concerning the serialized comic content.

The serialized comic content can include the step of creating plural comic contents and assigning a serial identifier to each one of the plural comic content, each next one of the plural comic contents continuing a story from a previous one of the plural comic contents and or illustrating the story with pictorial graphics and with text corresponding to the pictorial graphics.

The method can include the step of assigning a keyword to one or more pictorial graphics for locating the pictorial graphic within the plural comic content. The method of communication medium can be a multimodal input selected from a group consisting of a phone call recorder, a camera phone and a personal computer recorder, and the wireless communication device is one of an iPhone®, Smartphone or feature cellular phone; can include providing voicemail to input a component of the serialized comic media file from the serialized comic content provider to a website for a pod cast view by the users, and or accessing an IVR system for providing the voicemail.

The serialized comic content provider can be selected from at least one of an online store, serialized comic content provider. The method can include the step of converting the serialized comic content media file into a plurality of formats, the plurality of formats selected from the group consisting of RSS, Web playback, Java, Flash player, and IVR playback. The method can include selecting the multimodal outputs from a group consisting of a wireless device and a web connected computer, the wireless device being selected from a mobile phone and a PDA (personal digital assistant). The method can include the students accessing the serialized comic content media files through at least one of text multimedia messaging, via audio messages, email messaging and interactive voice responses (IVR).

The serialized comic content multimedia storage and delivery system includes providing storage of and on-demand access to the serialized comic content. The distribution step can include selecting content options and delivery options. The delivery method can include the step of selecting the comic content delivery from the group consisting of text, Web, audio file, IVR, and video delivery modes based on learner preference or context, text messaging by SMS(Short messaging service) and MMS.

The serial distribution step can include the step of creating a custom distribution schedule of the serialized comic content based on a custom user identification schedule. The custom distribution schedule includes the step of developing the custom distribution schedule by each one of the plural users, distributing each next one of the serialized comic content based on the user created distribution schedule and updating a user profile to record distribution of the last distributed one of the serialized comic content. The serial distribution step can include receiving a keyword from one or more users for distribution of a next one of the serialized comic content, distributing a next one of the serialized comic content based on the prompt received and updating the user a user profile to record distribution of the last distributed one of the serialized comic content.

The omic content multimedia storage and delivery system uploading step can include using text messaging, email, Web, audio files or interactive voice response, video over mobile or fixed devices.

Further objects and advantages of this invention will be apparent from the following detailed description of the presently preferred embodiments which are illustrated schematically in the accompanying drawings.

BRIEF DESCRIPTION OF THE FIGURES

FIG. 9 shows a screen shot of a student selecting content options and delivery options.

DESCRIPTION OF THE PREFERRED EMBODIMENTS

Figure 1:
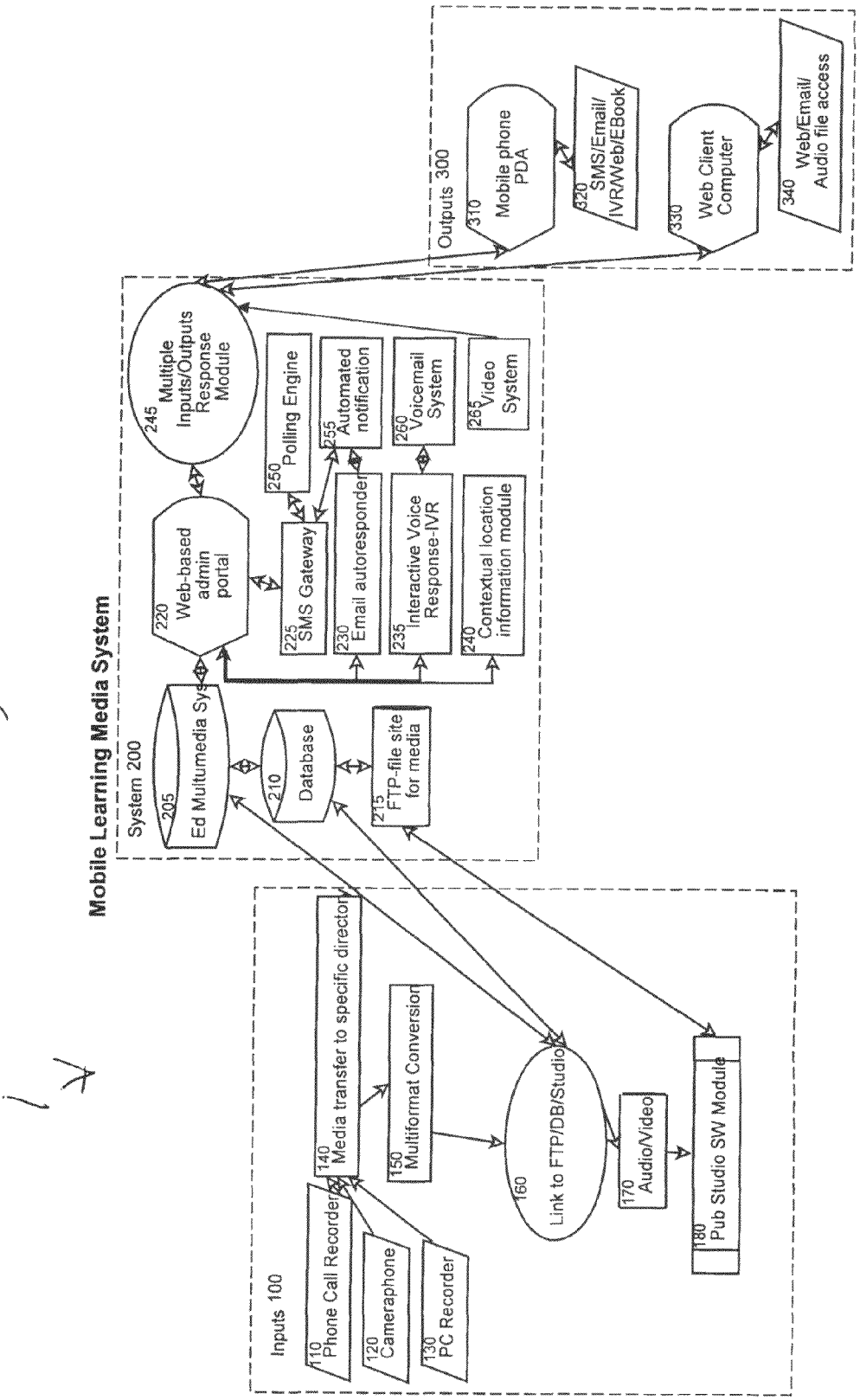
FIG. 1 shows an overview figure of the mobile learning media system of the invention.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of the components in the figures will now be described.
1 Mobile Learning Media System
100 Multi-modal inputs
110 phone call recorder
120 camera phone
130 PC recorder
140 media transfer to specific directory
150 Multi-format Conversion
160 Link to FTP/DB Studio
170 Audio/Video
180 Pub Studio SW Module
200 Educational multimedia storage and delivery system
205 Educational Multimedia System
210 Database
215 FTP-file site for media
220 Web-based admin portal
225 SMS gateway
230 Email autoresponder
235 Interactive Voice Response-IVR
240 Contextual location information module
245 Multiple Inputs/outputs Response Module
250 Polling Engine
255 Automated Notification
260 Voicemail system
265 Video system
300 Outputs
310 Mobile Phone/PDA
320 SMS/Email/IVR/Web/eBook
330 Web Client Computer
340 Web/Email/Audio file access.

As previously discussed, a professor, either online or in the classroom, who has a great idea, is currently required to spend extra time efforts of having to get online, post the idea and present it out to a class in a very formal way or save the notes until the actual day of a lecture in the class. Such a time consuming and exhausting procedure takes all the spontaneity and excitement of an event.

The invention allows for using a voicemail system for recording responses that has been done effectively. The invention allows for user to dial up an 800 number—a toll-free number—punch in an access code, and press 1 to start recording. After the recording is over, press #, and if you want to publish it directly to a podcast, you would then press # again or you could press another number for later review at a website that you can go to if you're not sure that you got it right. These podcasts can be populated through RSS feeds to a variety of different sites so that the up-to-date information is posted in course management systems, intranets, or other types of course sites and with some simple scripting, it's possible to also post this into either an existing voicemail system, such as those provided by the mobile phone company or the universities or other learning organizations, or to post it to an interactive voice response system in those areas where people do not have their own personal voicemail or it's not as easy to access.

This then gives students a way to either have the information show up directly in their in-box, say for a new notice about a student meeting will or will not be taking place or for new information from an interview that a professor just did, or a timely not from an executive to his staff. Students can simply listen to their voicemail to hear the announcement or in the case of the voice response system, it's as simple as what they do when they dial up to hear their credit card information. They would say or speak the name of the instructor or the class that they have, and then they would be able to either hear notes or have text information read back to them and have easy access.

The invention allows for extra options of signing up for SMS (short message service) updates of class notes, other resource material, syllabus and other information. The students have a choice of having this delivered through SMS or email.

Using these existing technologies and pushing for maximum penetration of mobile learning technology is more useful than advanced featurism usable by only a few with select phones and advanced capability. This egalitarian approach to mobile learning and mobile technology deployment, in general, will lead to broader user adoption, lower cost of deployment, and greater user acceptance. Taking this approach will also provide a clear path to the advanced features that can be deployed over a longer term, strategic technology transition road map. This will substantially mitigate the risk factors involved in mobile technology deployment and mobile learning and will also provide a platform for new technology to be added and integrated using Web 2.0 technologies and serve as a base frame work for these other technologies.

Additionally, the invention can include Digital Video Recorder (DVR) technology, location awareness, mobile games and simulations used for learning and human performance purposes and deployment of other advanced media on the devices. The combination of these additional steps and doing it well will overcome inertia, ensure that there is not a long wait for deployment of technology and again, build a platform on which other technologies can be deployed. This is a similar approach taken by other individuals that have been very successful in their technology deployments such as Jeff Hawkins with his first palm pilot and his ease of use as a key factor rather than advanced featurism. The uptake and market adoption of the product was phenomenal because of its dedication to simplicity and use of existing features that met human performance needs and tied into existing capabilities and functions.

Figure 2:
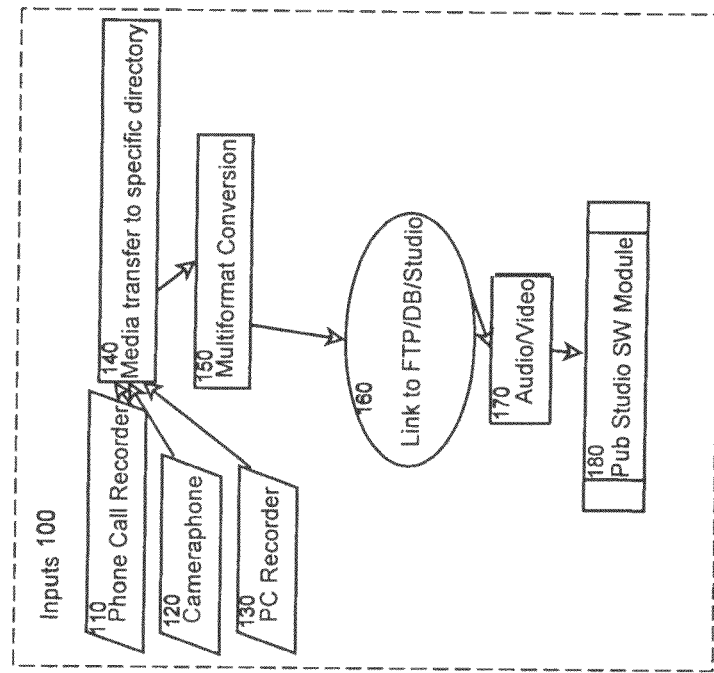
FIG. 2 is a flowchart of the input components of the system of FIG. 1.
Figure 3:
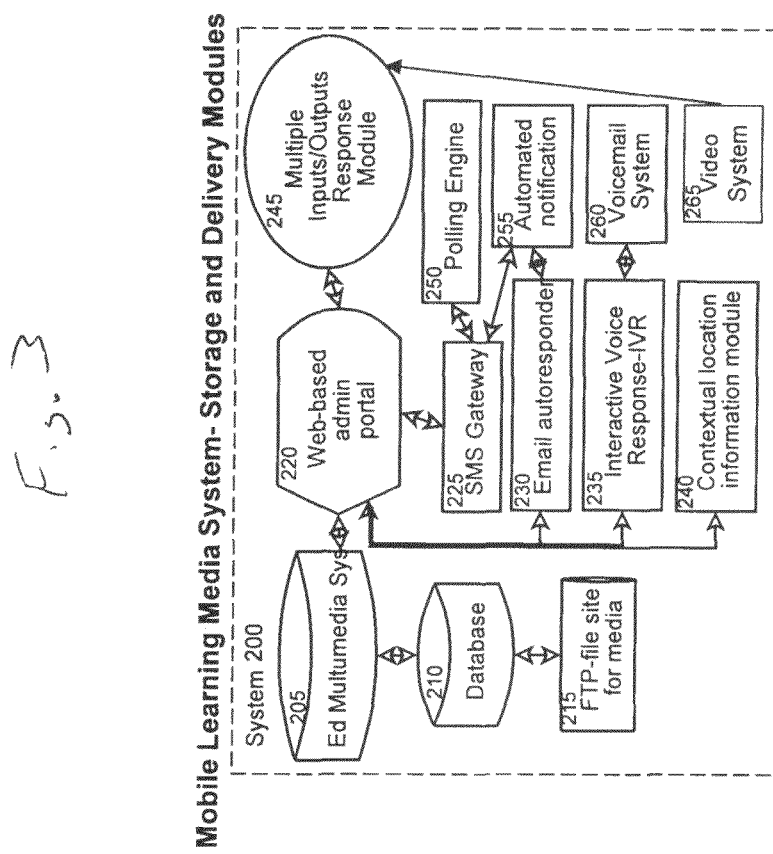
FIG. 3 is a flowchart of the educational multimedia storage and delivery system components of FIG. 1.
Figure 4:
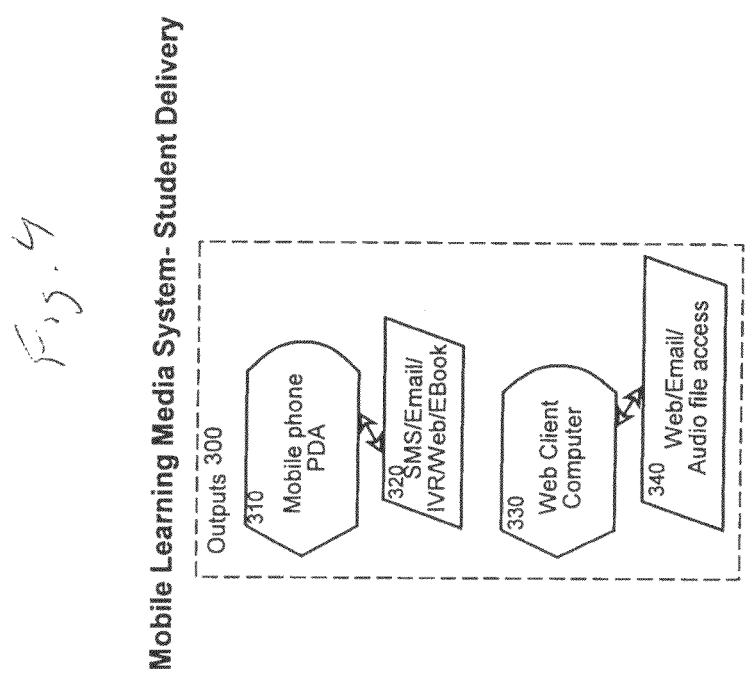
FIG. 4 is a flowchart of the output components of FIG. 1.

FIG. 1 shows an overview figure of the mobile learning media system 1 of the invention. FIG. 2 is a flowchart of the input components 100 of the system of FIG. 1. FIG. 3 is a flowchart of the educational multimedia storage and delivery system components 200 of FIG. 1. FIG. 4 is a flowchart of the output components 300 of FIG. 1.

The mobile learning invention consists of three main sections (multi-modal inputs 100, educational multi-media storage and delivery system 200, and multi-modal outputs 300. The invention is primarily directed to education and training applications. For educational applications, the invention can be practiced in corporate education programs, higher education programs namely college and university and graduate school, and lower levels of kindergarten through 12$^{th}$ grade. For training applications, the invention can be used to provide training in corporate, military, nonprofit and medical environments. The invention is not for practice in certain areas such as for solely marketing applications that are void of any educational and learning content.

The invention is directed to the capture and storage and delivery of education media files. The education media file(s) covers content from fields of study in education and learning applications, where the fields of study can further include subcategories of learning, human performance, knowledge or cognitive content.

Referring to FIGS. 1 and 2, the multi-modal input components 100 to the mobile learning media system 1 can include various inputs that an instructor/educator and/or course provider can input into the system. In a selected education application, the phone call recorder 110, and/or a camera phone 120 and/or a PC (personal computer) recorder 130 can capture various information into an educational media file such as but not limited to Class Notes, News and Surveys, Links to media—video/audio, and/or MMS push—multimedia slideshow/short video messages, courses, books, and other educational and learning content.

The data passes to a media transfer to specific directory 140 where it is aggregated and sorted into a specific watched directory for periodic conversion.

A multi-format conversion step 150 can convert the educational media file into a plurality of formats, such as a group consisting of RSS(Real Simple Syndication) Feeds, Web playback, Java, Flash player, and IVR playback.

The converted files pass to a Link to FTP/DB (File Transfer Protocol/Database) Studio 160 where Audio/Video can be separated for editing in step 170 and a link to an FTP (file transfer protocol) site in 215 for media storage and a DB (database) in 210 for storage of text files, questions, simulations, images and smaller (less than 295 kilobytes) media. Student records can also be sent to an Education Multimedia System in 205 for storage or for further processing.

An Audio/Video step 170 can be used that segments larger media to be available to the Publishing Studio Software Module in 180.

Next, a Pub (publishing) Studio SW (software) Module 180 can be used for editing, conversion, filtering, special effects, processing and compiling of audio, video and still image components.

The educational media file(s) from the input components 100 can be uploaded to an Educational multimedia storage and delivery system 200, where a Educational Multimedia System 205 stores educational records and manages learning content.

A Database 210 such as but not limited to MySQL receives text files, questions, simulations, images and smaller (less than 295 kilobytes) media. from the system 205. Media, files and records can be cataloged in a Database 210 and called up for Web organization in system 205. MySQL is an open source database application. (This is used as an example, but could be any database.

The educational multimedia storage and delivery system 200 can include storage of and access to educational records and learning content. The educational multimedia storage and delivery system 200 can include a directory file system for storing Binary Large OBjects (BLOBs) for accommodating large media like videos and maintaining speed and efficient operations of database functions. The educational multimedia storage and delivery system 200 can include a directory file system for rapid access to text and small hash tables of limited content domains.

FTP (File Transfer Protocol)-file site 215 for media stores and retrieves audio and video media. Audio and Video media from FTP 215 can be accessed and stored with pointers from the database 210.

Web-based admin portal 220 is the user interface and Web organization structure for viewing, adding and modifying learning events including scheduled and event triggered SMS in SMS Gateway 225, email in email auto responder 230, interactive voice response in IVR 235, location-based content in module 240.

SMS gateway 225 sends and receives text messages including automated polling from mobile phones and automated notifications. SMS refers to Short Message Service for text messaging to and from mobile phones. Rules for monitoring interactions and triggering events based on keywords or time triggers are controlled within this module.

Web-based admin. portal 220 allows for viewing, adding and modifying learning events including scheduled and event triggered SMS in SMS Gateway 225.

An Email auto responder 230 sends and receives email messages including automated notifications. Rules for monitoring interactions and triggering events based on keywords or timed triggers are controlled within this module.

System 205 allows for viewing, adding and modifying learning events including scheduled and event triggered email in 230.

Interactive Voice Response—IVR 235 sends and receives audio messages including automated notifications. Rules for monitoring interactions and triggering events based on keywords or timed triggers are controlled within this module.

System 205 further allows for viewing, adding and modifying learning events including scheduled and event triggered IVR audio files in IVR 235.

Contextual location information module 240 processes location and environmental information and appends it as metadata in the system for launching certain media or learning elements or triggering events.

System 205 further allows for viewing, adding and modifying learning events including scheduled and event triggered location information in 240.

Multiple Inputs/outputs Response Module 245 manages the delivery of SMS, email, IVR, Web and EBook content to and from mobile and fixed devices. 220 is the Web-based user interface for administration and processing of inputs and outputs from the internal system and outputs 300.

Polling Engine 250 sends and receives user responses to questions and simulations and forwards the messages through SMS Gateway 225 to outputs 300 through module 245.

Automated Notification 255 can be used to send and receive notifications and forwards the messages through IVR 225 or email auto-responder 230 to outputs 300 through module 245.

Voicemail system 260 can be used to deliver IVR content to and from existing, enterprise voicemail systems. 260 links to existing interactive voice response 235 module through common libraries and protocols including, but not limited to vXML (Voice eXtensible markup Language). Commercial voicemail systems can be used to automate recording of messages or for input and output delivery of voicemail audio files.

Video system 265 is used for delivery of pointer information, in the form of URLs (Uniform Resource Locator), system calls and file access techniques, to access media stored in the FTP 215 or Database 210 components. Module 245 can call back to database 210 and/or FTP 215 to deliver the actual video media files to outputs 300 through module 245.

The multi-media educational file can be downloaded to outputs 300, that can be accessible by students, and users of the mobile learning media system 1.

Various outputs 300 can include a Mobile Phone/PDA (personal digital assistant) or a fixed device, including, but not limited to a Web client computer for review and response by the end user to multiple modes of interaction and media from system 200.

Module 245 delivers to and receives from 310 learning events in a format compatible with mobile devices. These formats include, but are not limited to SMS (short email text messages)/Email/IVR/Web/eBook 320 for two-way communication through mobile phone/PDA 310, to system 200. A fixed device, Web Client Computer 330 such as but not limited to a, desktop computer or Laptop delivers to and receives from 245 learning events in a format compatible with fixed devices. These formats include, but are not limited to Web/Email/Audio file access 340 for two-way communication through Web client computer 330, to system 200.

Figure 5:
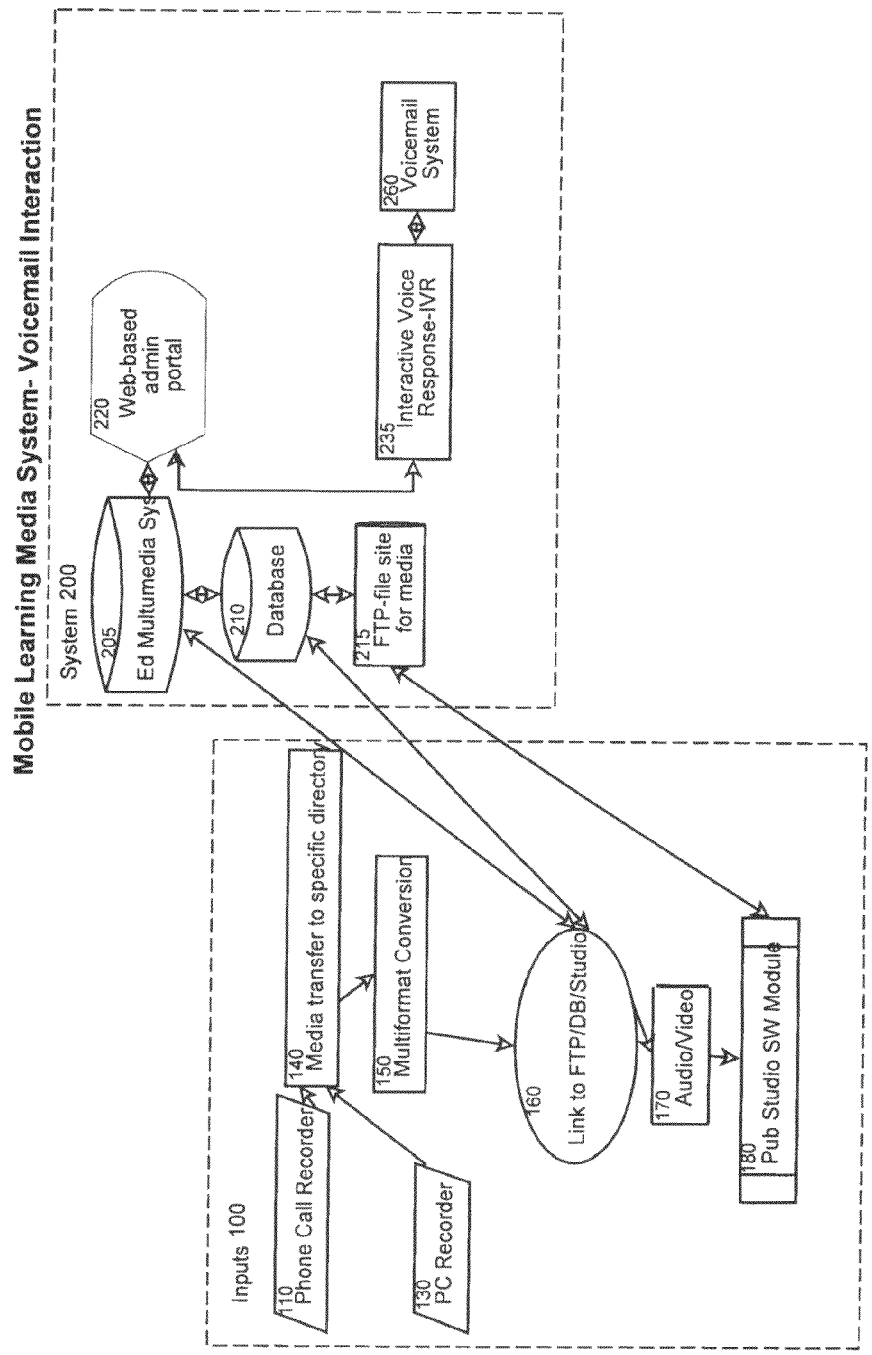
FIG. 5 is a flowchart of using voicemail an input to the system of FIG. 1.

FIG. 5 is a flowchart of using voicemail as an input to the system of FIG. 1. Referring to FIGS. 1-3 and 5, the Voicemail system 260 and the Interactive Voice Response system 235 can each record input over a standard phone connection from 110. Alternately, audio files can be recorded and uploaded from a PC Recorder 130 function.

Figure 6:
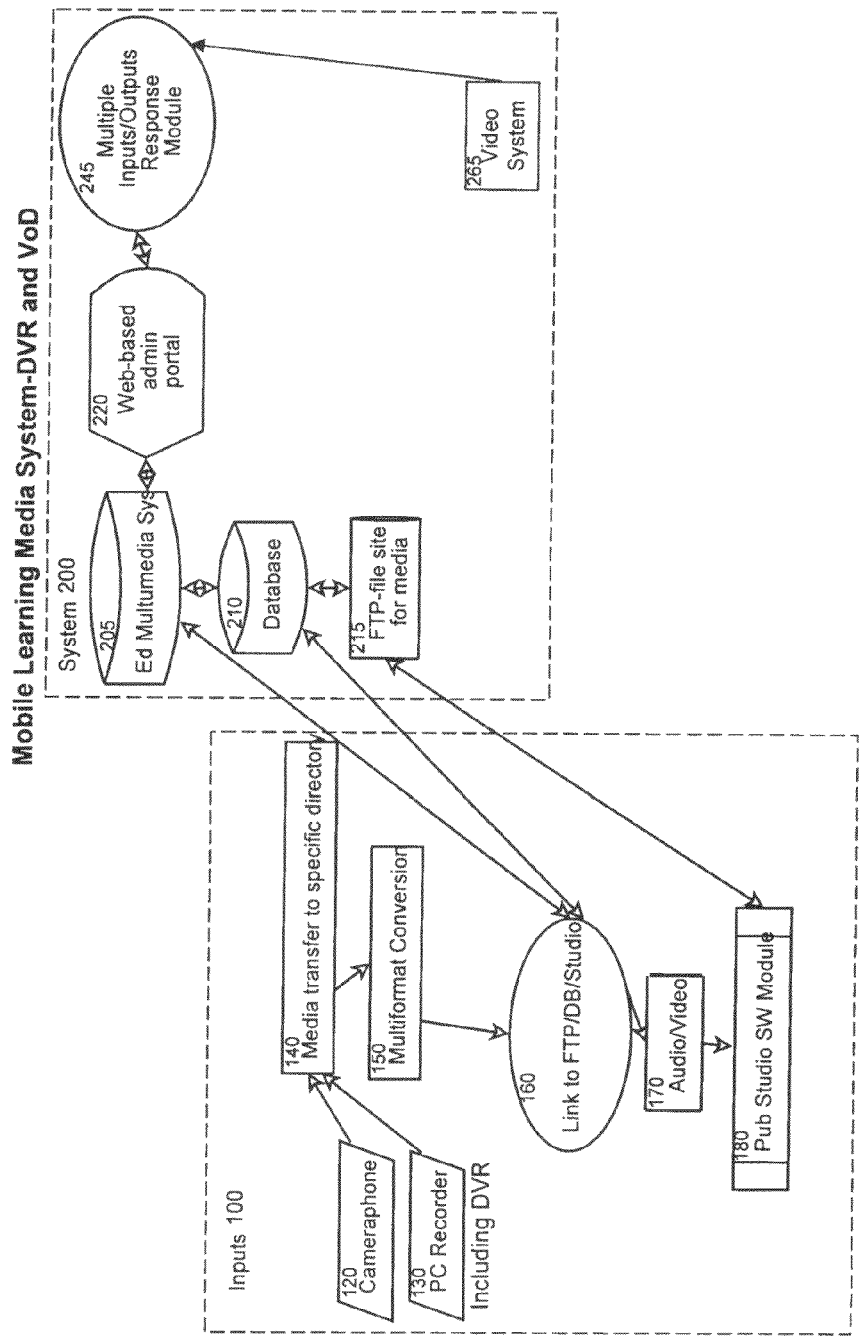
FIG. 6 is a flowchart of using Digital Video Recording (DVR) and using Video on Demand (VOD) with the system of FIG. 1.

FIG. 6 is a flowchart of using Digital Video Recording (DVR) and using Video on Demand (VOD) with the system of FIG. 1. Referring to FIGS. 1-3 and 6, the Digital Video Recording function can be recorded and uploaded through Link 160 to database 210 for pointer information to the actual media files in the FTP file site 215. Video on Demand service can access video system 265 to deliver video content through module 245 from database 210 and FTP 215.

Figure 7:
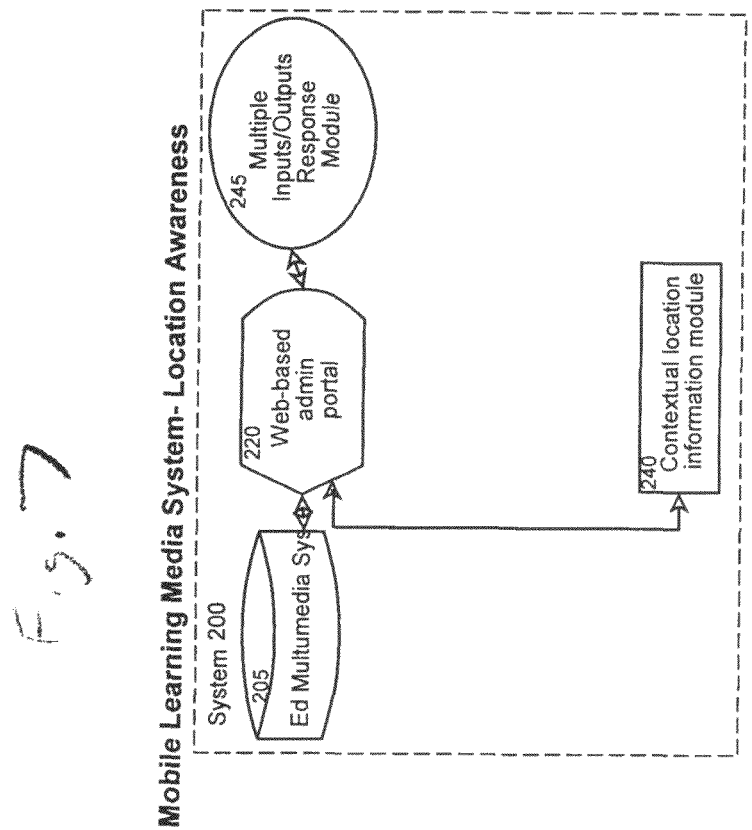
FIG. 7 is a flowchart of using location awareness with the system of FIG. 1.

FIG. 7 is a flowchart of using location awareness with the system of FIG. 1. Referring to FIGS. 1, 3 and 7, Location awareness 240 is an important component of the multimodal delivery system 1 that defines the context for the learning and appropriate media to deliver based on the location of the learner, using system 205, Web-based admin portal 220 and module 245.

Figure 8:
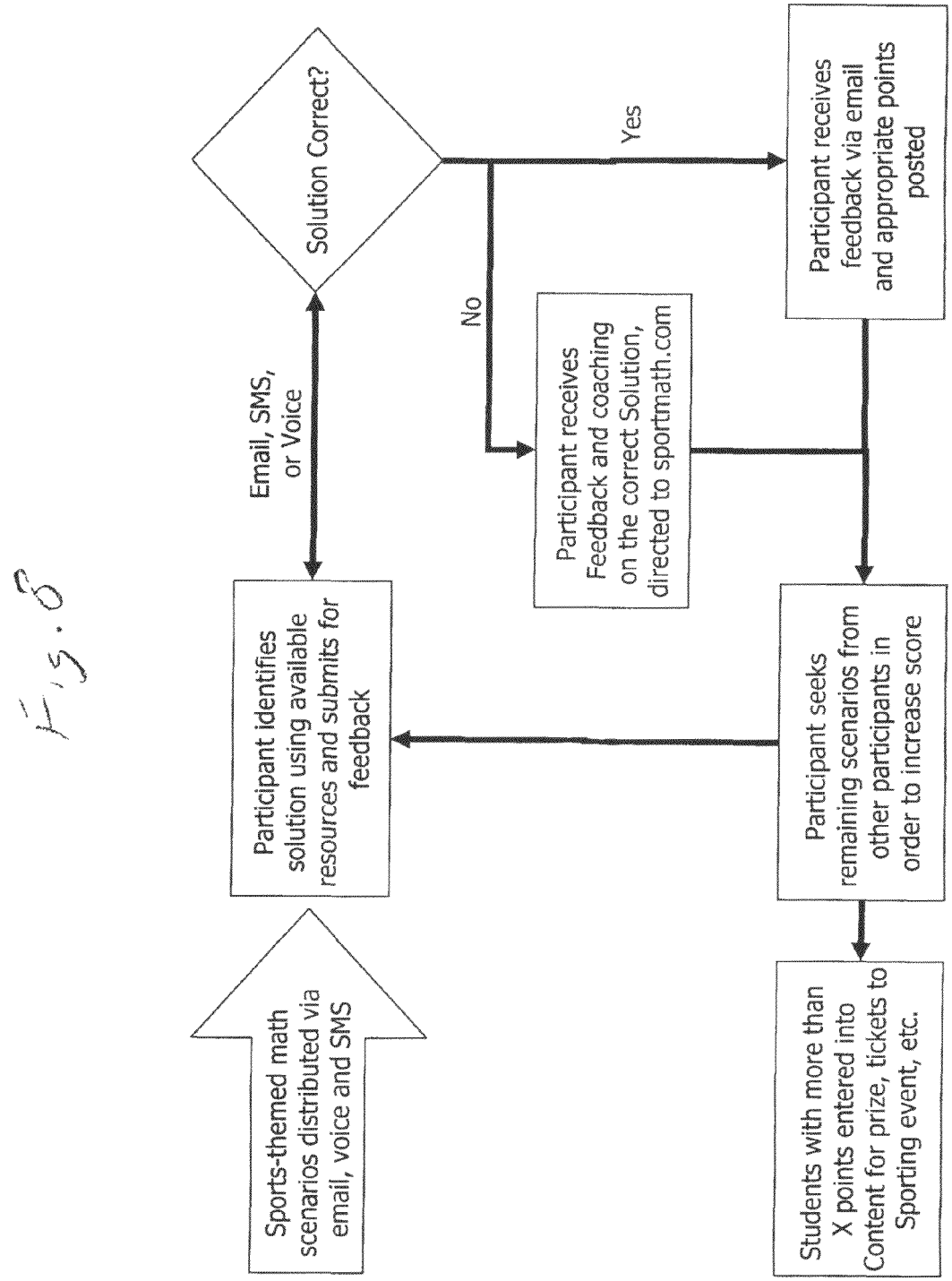
FIG. 8 is a flowchart of using mobile games with the system of FIG. 1 and is a flowchart of using simulations for learning and human performance with the system of FIG. 1.

FIG. 8 is a flowchart of using mobile games with the system of FIG. 1 and is a flowchart of using simulations for learning and human performance with the system 1 of FIG. 1. FIG. 8 is a system diagram showing the scoring system and prizes based on the questions and answers found in each learning scenario/simulation. FIG. 8 is also a system diagram showing the learning scenario/simulations in the initial setup of the modules and delivery over SMS, email, IVR or Web in system 1. Scenarios can be input into the system using the Web-admin portal 220.

FIG. 9 shows a screen shot of a student selecting content options and delivery options. Students can choose their preference for delivery of scenarios, questions and notifications from a drop-down menu of SMS, email, IVR, or Web delivery and interaction modes.

Figure 10:
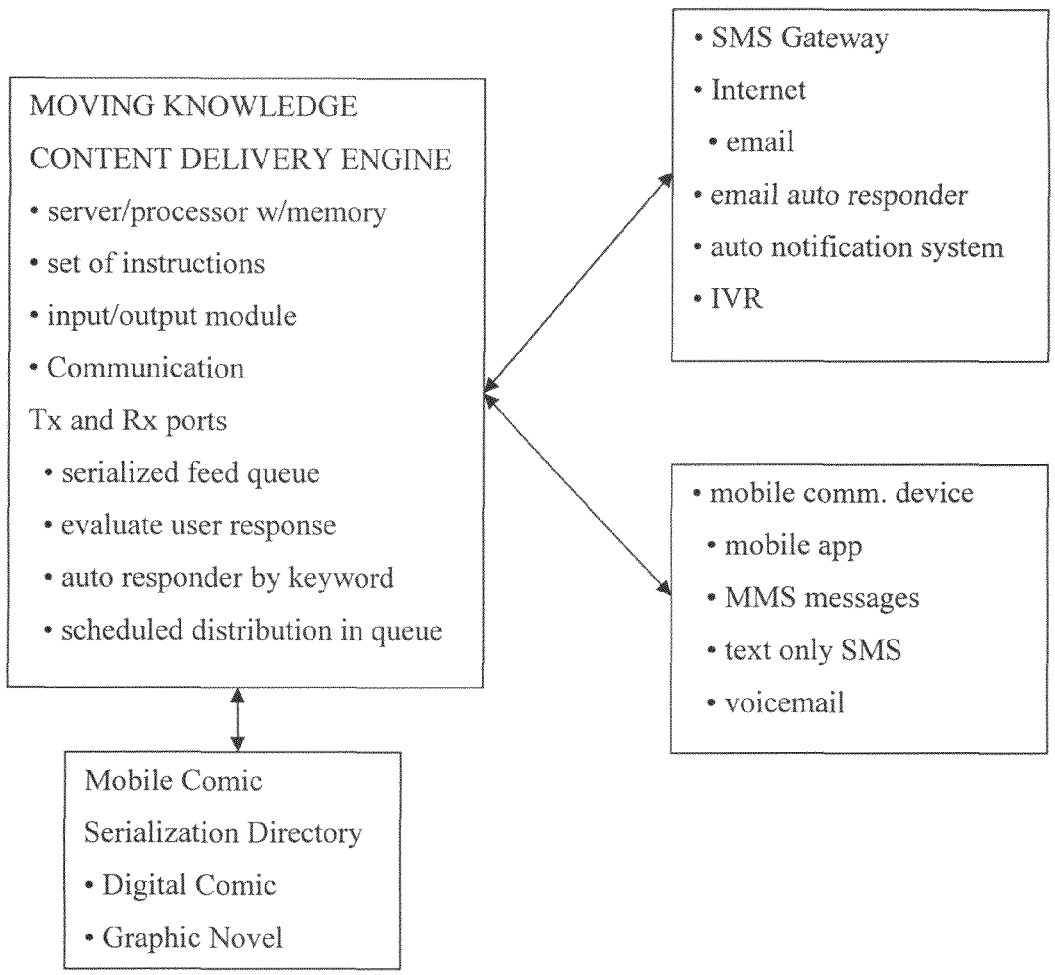
FIG. 10 is a block diagram showing the serialized comic content on the moving knowledge platform.
Figure 11:
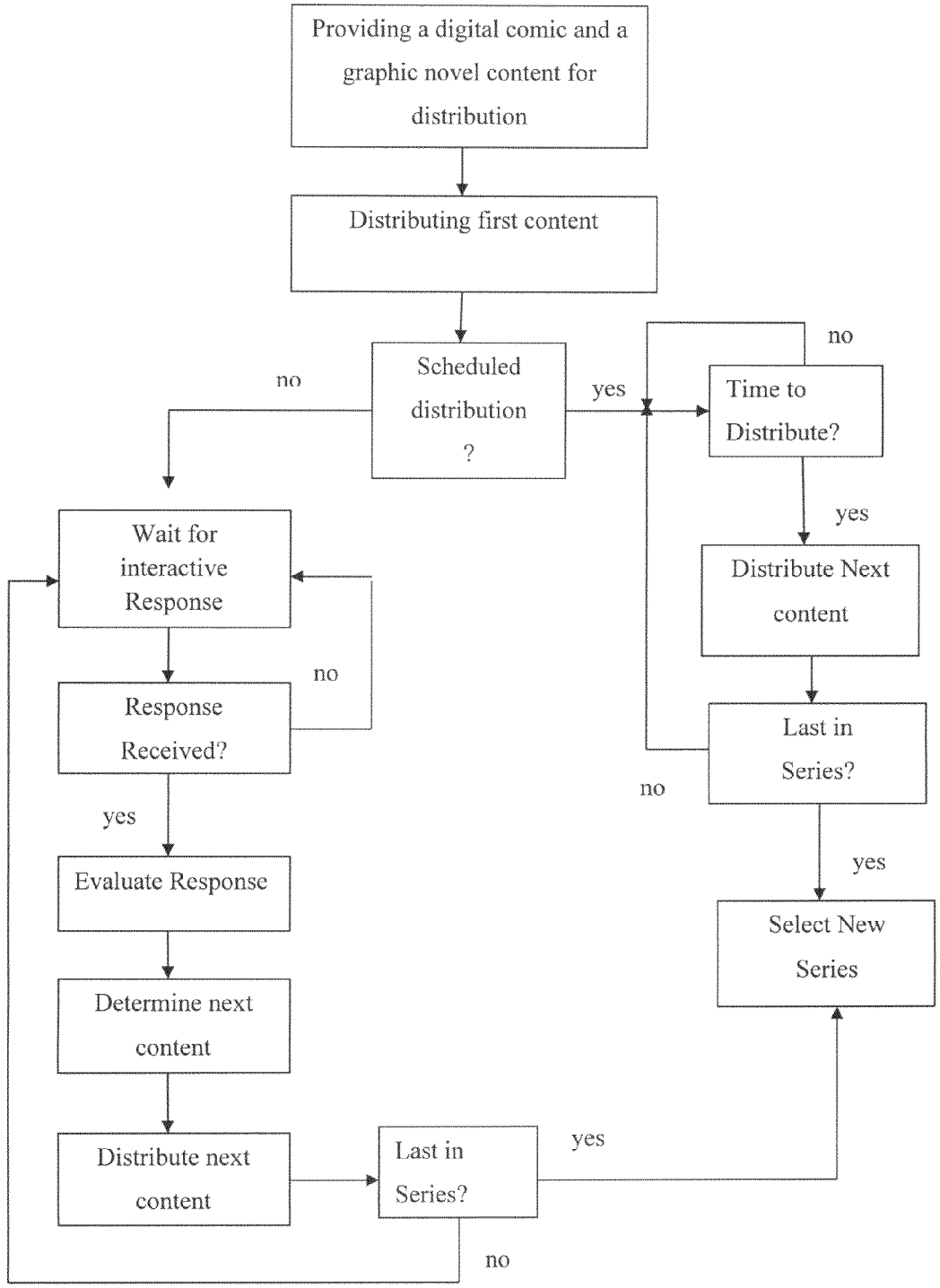
FIG. 11 shows an example of the flow sequence between receiving and responding to content.
Figure 12:
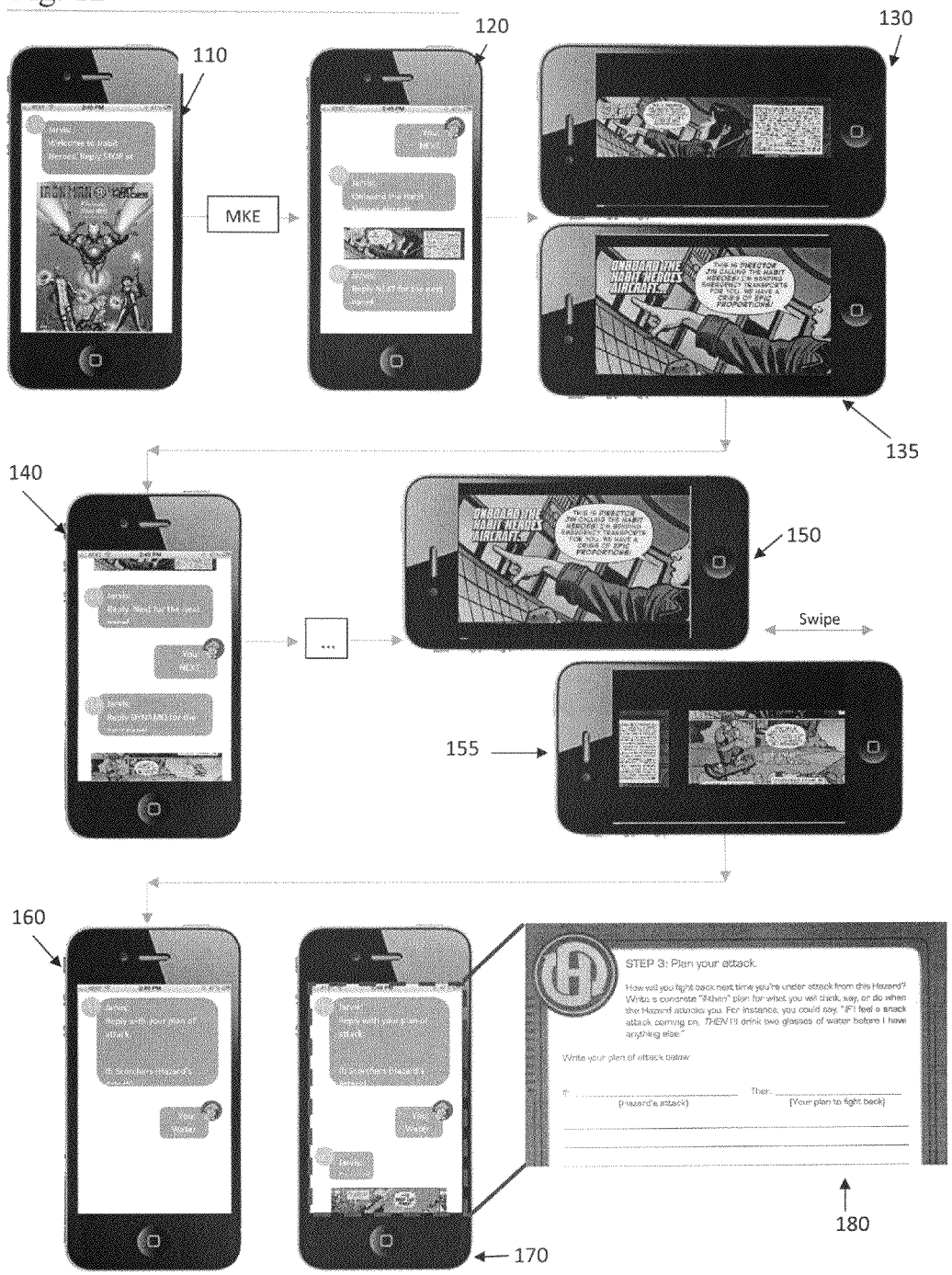
FIG. 12 is a flow diagram showing an example of comic content and the interaction of the user with the comic content according to the present invention.

A second embodiment provides for mobile comic serialization using messaging on the moving knowledge engine platform. FIG. 10 is a block diagram showing the system for implementing the mobile comic serialization and FIG. 11 is a process flow diagram showing an example of steps for serialized interactive mobile content delivery. The example shown is for delivering serialized mobile comic using messaging.

This embodiment of the present invention combines an serialized comic multimedia storage and delivery system using multi-modal inputs and multi-modal outputs for delivering serialized comic media files, along with any one or more features using E-mail, SMS text message content push, MMS graphic and text messaging, Podcasts, serialized eComic Books delivery, and the like as shown in FIG. 10. The delivery can be a scheduled delivery or can be based on keywords received from the user as shown in FIG. 11.

For example, E-mail, SMS and MMS Message content push can include Links to media—video/audio and MMS push—multimedia slideshow/short video msg. Podcasts can include Podcast Studio—1-800 number direct publish to web and students subscribe and listen to MP3s, Multimodal delivery via text messaging/e-mail, scheduled downloaded audio/graphic/video files and the like. Serialized comic eBooks includes Secure, for example, SDRM (secure digital rights management) access, text, graphic messaging, audio, video, and web content.

Additional applications of the serialized mobile reading invention can combine a serialized comic multimedia storage and delivery system having multi-modal inputs and multi-modal outputs for delivering comic media files, with one or more of Digital Video Recorder (DVR) and other mobile VOD for graphic reading content, online interactive comic games between multiple devices, link to portals and the like.

Serialized Interactive, educational comic using the Moving Knowledge content delivery engine can distribute an interactive, educational comic to users in a serialized mobile format. Individual or small combinations of comic panels will be delivered as images via MMS messages, with alternate text-only SMS options that will supply a link to retrieve the image along with ADA compliant alt-text for visually impaired users.

Content can be distributed two ways: automatically on a particular schedule and at user request via keywords as shown in the flow diagram of FIG. 11. All users can be subscribed to the serialized feed, but users can directly instruct the system to send them the next item by sending in a specified keyword (likely an emphasized bit of text from the comic itself). This means users will be able to move at their own pace, either sticking with the serialized delivery schedule or prompting the system for more to read in a few sessions as desired.

Since the Moving Knowledge Engine enables two-way communication and can evaluate user responses, as well as direct content distribution based on keyword or other response data, the present invention also distributes interactive items based on the Top Secret insert in the printed comic. This will allow users to send in answers or feedback from those items to the system, and send bonus information.

The Moving Knowledge Engine system collects general system usage metrics. This includes a list of users (subscriber email, user name or phone number), aggregate number of times each user interacted with the system along with associated time stamps for each interaction, and instances of user requests.

Augmented Reality Feature Implementation:

Augmented Reality (AR) technology can be used for learning and promotional purposes in healthcare projects. The methods and processes of the present invention can be configured to develop a basic AR implementation for comics that will supply additional information and persuasive media.

FIG. 11 shows an sample screen shots of the mobile comic content and interaction using a mobile communication device such as an iPhone®. As shown, the user receives the serialized comic with a welcome screen 110 and can interact with moving knowledge content delivery system as shown in the next screen shot 120. After acknowledgement from the user, the comic content is displayed for the user to view and read the distributed serialized comic as shown in screen shots 130 and 135. The content can display a "input required" screenshot 140 requiring the user to click on an icon or can contain a keyword for the user to enter. Based on the response from the user, a next serialized comic is transmitted to the user. The next serialized comic screenshot 150 is displayed and the user can swipe the touch screen to move forward to a next screenshot 155 and back to a previous screenshot in the comic book.

As previously described, the serialized comic can be interactive. In this example shown by the screenshot 160, the user, after reading a section of the comic has the option to plan his action as shown in the last screenshot 170. In the example shown, the interactive comic allows the user to plan his action based on If—Then scenarios where the user anticipates the characters possible attack and responds as shown by screenshot 170.

Although the example shown is a comic superhero example, the content can teach history using comic historical characters of a historical event. Using the serialized comics, the student can then travel through time with each next historical event being a next one of the serialized comics. Within each series, the historical characters come alive in the comic and the student can interact with the character. Those skilled in the art of education and educational content will understand that alternative uses of serialized comic content can be used to reinforce the learning event. For example, the student can be one of the historical characters and be required to correctly respond to actions taken by the historical character. Science can also be taught using the serialized comic content, for example chemistry can be taught with the student selecting different mixtures and the system responding with a screen relating to results from the mixed materials.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A multimodal serialized comic distribution method, comprising the steps of:
   providing a serialized comic content in a multimodal messaging program;
   creating a comic content distribution media file for serial distribution of the serialized comic content;
   uploading the serialized comic content media file to a serialized comic content multimedia storage and delivery system through a communication medium, the communication medium selected from at least one of a wireless communication device and an internet connected computer;
   communicating existence of the serialized comic content media file to plural users;
   serially distributing the serialized comic content media file multimedia storage and delivery system so as to be accessible by users recognized to receive the serialized comic content media file;
   accessing the serialized comic content file by one or more of the plural users through a user communication medium;
   recording distribution of the serially distributed comic content to the plural users on based a user identification; and
   providing two way multimodal interactive communications between a serialized comic content provider and one or more of the plural users concerning the serialized comic content.

2. The method of claim 1 wherein the serialized comic content comprises the step of:
   creating plural comic contents and assigning a serial identifier to each one of the plural comic content, each next one of the plural comic contents continuing a story from a previous one of the plural comic contents.

3. The method of claim 2 wherein the plural comic content creating step comprises the step of:
   illustrating the story with pictorial graphics and with text corresponding to the pictorial graphics.

4. The method of claim 3 further comprising the step of:
   assigning a keyword to one or more pictorial graphics for locating the pictorial graphic within the plural comic content.

5. The method of claim 1, wherein the communication medium comprises:
   providing a multimodal input selected from a group consisting of a phone call recorder, a camera phone and a personal computer recorder, and the wireless communication device is one of an iPhone®, Smartphone or feature cellular phone.

6. The method of claim 1, further comprising the step of:
   providing voicemail to input a component of the serialized comic media file from the serialized comic content provider to a website for a pod cast view by the users.

7. The method of claim 6, further comprising the step of:
   accessing an IVR system for providing the voicemail.

8. The method of claim 1, wherein the serialized comic content provider being selected from at least one of an online store, serialized comic content provider.

9. The method of claim 1, further comprising the step of:
converting the serialized comic content media file into a plurality of formats, the plurality of formats selected from the group consisting of RSS, Web playback, Java, Flash player, and IVR playback.

10. The method of claim 1, wherein the user communication medium accessing step includes the step of:
selecting from the group consisting of a wireless device and a web connected computer, the wireless device being selected from a mobile phone and a PDA (personal digital assistant).

11. The method of claim 1, further comprising:
users accessing the serialized comic content media files through at least one of text multi-media messaging, via audio messages, email messaging and interactive voice responses (IVR).

12. The method of claim 1, wherein the serialized comic content multimedia storage and delivery system uploading step includes the step of:
providing storage of and on-demand access to the serialized comic content medial files.

13. The method of claim 1, wherein the distribution step further includes the step of:
selecting content options and delivery options.

14. The method of claim 13, wherein the comic content delivery method includes the step of:
selecting from the group consisting of text, Web, audio file, IVR, and video delivery modes based on learner preference or context, text messaging by SMS (Short messaging service) and MMS.

15. The method of claim 1, wherein the serially distribution step includes the step of:
creating a custom distribution schedule of the serialized comic content based on a custom user identification schedule.

16. The method of claim 15, wherein the custom distribution schedule creation step includes the steps of:
developing the custom distribution schedule by each one of the plural users;
distributing each next one of the serialized comic content based on the user created distribution schedule; and
updating a user profile to record distribution of the last distributed one of the serialized comic content.

17. The method of claim 2, wherein the serial distribution step includes the step of:
receiving a keyword from one or more users for distribution of a next one of the serialized comic content;
distributing a next one of the serialized comic content based on the prompt received; and
updating the user a user profile to record distribution of the last distributed one of the serialized comic content.

18. The method of claim 1, wherein the comic content multimedia storage and delivery system uploading step can include:
using text messaging, email, Web, audio files or interactive voice response, video over mobile or fixed devices.

* * * * *